(12) United States Patent
Ito

(10) Patent No.: US 8,547,412 B2
(45) Date of Patent: Oct. 1, 2013

(54) IMAGE FORMING APPARATUS

(75) Inventor: Tomoya Ito, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 105 days.

(21) Appl. No.: 13/044,529

(22) Filed: Mar. 9, 2011

(65) Prior Publication Data
US 2011/0243590 A1 Oct. 6, 2011

(30) Foreign Application Priority Data

Mar. 30, 2010 (JP) ................................ 2010-078044

(51) Int. Cl.
*B41J 27/00* (2006.01)
*B41J 2/435* (2006.01)
*B41J 2/47* (2006.01)
*B41J 2/455* (2006.01)
*B41J 15/14* (2006.01)
*G01D 15/14* (2006.01)
*H01J 29/70* (2006.01)
*H01J 33/00* (2006.01)

(52) U.S. Cl.
USPC ........... 347/261; 347/224; 347/225; 347/231; 347/233; 347/241; 347/243; 347/256; 347/259; 347/260; 359/17; 359/18; 359/19; 359/20; 359/196.1

(58) Field of Classification Search
USPC ....... 347/224–261; 359/17–20, 196.1–226.3; 399/33
See application file for complete search history.

(56) References Cited

U.S. PATENT DOCUMENTS

| 5,430,362 | A  | * | 7/1995  | Carr et al. ..................... 318/779 |
| 6,204,868 | B1 | * | 3/2001  | Yamauchi et al. ............ 347/129 |
| 6,822,672 | B1 | * | 11/2004 | Able et al. .................... 347/261 |
| 7,248,276 | B2 | * | 7/2007  | Suzuki .......................... 347/237 |

(Continued)

FOREIGN PATENT DOCUMENTS

| JP | H05-080642 A | 4/1993 |
| JP | H09-098592 A | 4/1997 |

(Continued)

OTHER PUBLICATIONS

Japan Patent Office, Notification of Reasons for Refusal for Japanese Patent Application No. 2010-078044, dispatched Jan. 19, 2012.

(Continued)

*Primary Examiner* — Laura Martin
*Assistant Examiner* — Jeremy Bishop
(74) *Attorney, Agent, or Firm* — Baker Botts L.L.P.

(57) ABSTRACT

An image forming apparatus includes: a light source; a photosensitive member; a brushless motor including a stator and a rotor; a rotary polygon mirror rotated by the brushless motor; an energization switching unit that turns on/off energizations of the coils; a voltage detecting unit that outputs a detection signal based on induced voltages generated in coils of the stator by rotation of the rotor; and a motor controlling unit that controls the turning on/off of the energizations by the energization switching unit based on the detection signal. In a non-image forming period after one image forming operation, the motor controlling unit performs a low-speed process where the motor controlling unit maintains a rotation speed of the brushless motor at a speed, which is lower than a speed in the image forming operation, and at which the induced voltages are detectable by the voltage detecting unit.

8 Claims, 9 Drawing Sheets

(56) References Cited

U.S. PATENT DOCUMENTS

| | | | |
|---|---|---|---|
| 7,327,378 B2 * | 2/2008 | Han et al. | 347/243 |
| 8,259,150 B2 * | 9/2012 | Kubo | 347/261 |
| 2003/0194246 A1 | 10/2003 | Hayashi et al. | |
| 2004/0207717 A1 | 10/2004 | Han et al. | |
| 2005/0218845 A1 * | 10/2005 | Okamoto | 318/254 |
| 2010/0245521 A1 | 9/2010 | Kubo | |

FOREIGN PATENT DOCUMENTS

| | | |
|---|---|---|
| JP | H11-015332 A | 1/1999 |
| JP | H11-129538 A | 5/1999 |
| JP | H11-344913 A | 12/1999 |
| JP | 3179533 B2 | 6/2001 |
| JP | 2003-302874 A | 10/2003 |
| JP | 2004-326105 A | 11/2004 |
| JP | 2007-062266 A | 3/2007 |

OTHER PUBLICATIONS

State Intellectual Property Office of the People's Republic of China, Notification of the First Office Action for Chinese Patent Application No. 201110078911.2 (counterpart to above-captioned patent application), mailed Jun. 26, 2013.

* cited by examiner

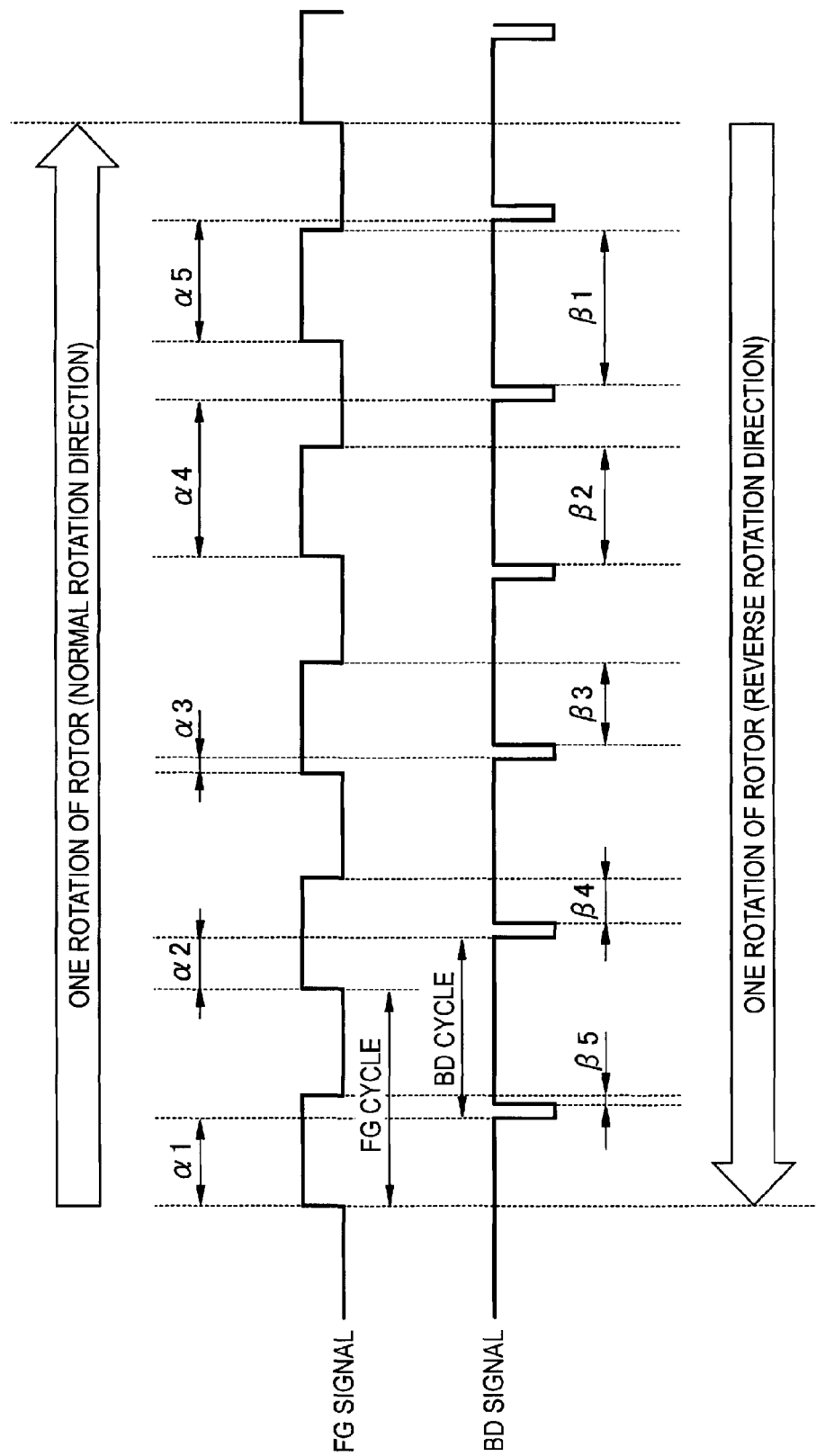

IMAGE FORMING APPARATUS

CROSS-REFERENCE TO RELATED APPLICATIONS

This application claims priority from Japanese Patent Application No. 2010-078044 filed on Mar. 30, 2010, the entire subject matter of which is incorporated herein by reference.

TECHNICAL FIELD

The present invention relates to an image forming apparatus, and more particularly to a brushless motor for rotating a rotary polygon mirror.

BACKGROUND

Some image forming apparatuses that form an image electrophotographically include an optical scanning mechanism having a rotary polygon mirror which deflects a light beam emitted from a light source to illuminate a photosensitive member. A brushless motor is sometimes used as a driving motor for rotating the rotary polygon mirror. In a brushless motor, it is necessary to detect a position of a rotor to control energization timing for each coil. There has been proposed a known image forming apparatus, in which a plurality of Hall elements are placed in a vicinity of the rotor, and the position of the rotor is detected based on output signals of Hall elements.

In the known image forming apparatus, because of placement dispersion of the Hall elements with respect to the rotor, or the like, it is difficult to detect the position of the rotor accurately. Thus, the rotation control on the brushless motor may be unstable.

SUMMARY

The applicant of the present application has developed an image forming apparatus in which a rotation control on a brushless motor can be performed without using Hall elements. Specifically, the image forming apparatus includes: an energization switching unit which turns on and off energizations of coils of the brushless motor; a voltage detecting unit which outputs a detection signal based on induced voltages that are generated in the coils by rotation of the rotor; and a control unit which controls turning on/off of the energizations by the energization switching unit, based on the detection signal.

In the image forming apparatus which does not use Hall elements, when the brushless motor is rotated by inertia after an image forming operation based on one image forming instruction is ended, for example, the rotation speed of the brushless motor is sometimes lowered to a level at which the induced voltages cannot be detected. At this time, since the brushless motor is inertially rotated and moreover the induced voltages cannot be detected, it may be difficult to control the rotation of the brushless motor properly. Further, when the next image forming instruction is given in such a state, it may also be difficult to control the rotation of the brushless motor properly, and thus the start of an image forming operation based on the next image forming instruction may be delayed. It may be contemplated that the rotation control on the brushless motor is continued also after the end of the image forming operation. In this case, a large amount electric power may be consumed before the reception of the next image forming instruction.

Illustrative aspects of the invention provide an image forming apparatus in which, while attaining the power saving, the time from the reception of the next image forming instruction after end of an image forming operation to start of the image forming operation can be suppressed from being prolonged.

According to one illustrative aspect of the invention, there is provided an image forming apparatus comprising: a light source that emits a light beam; a photosensitive member that carries a toner image; a brushless motor comprising: a stator in which a plurality of coils are placed; and a rotor in which a plurality of magnets are placed; a rotary polygon mirror, which is rotated by the brushless motor, and which periodically deflects the light beam emitted from the light source to sequentially form scanning lines on the photosensitive member; an energization switching unit that turns on and off energizations of the coils; a voltage detecting unit that outputs a detection signal based on induced voltages that are generated in the coils by rotation of the rotor; and a motor controlling unit that controls the turning on/off of the energizations by the energization switching unit based on the detection signal, wherein in a non-image forming period after one image forming operation is ended, the motor controlling unit performs a low-speed process, and wherein in the low-speed process, the motor controlling unit maintains a rotation speed of the brushless motor at a speed, which is lower than a speed in the image forming operation, and at which the induced voltages are detectable by the voltage detecting unit.

According to the one illustrative aspect of the invention, in the non-image forming period after one image forming operation is ended, the low-speed process is performed where the rotation speed of the brushless motor is maintained at a speed which is lower than that in the image forming operation, and at which the induced voltage can be detected by the voltage detecting unit. In this way, the rotation speed in the non-image forming period is lower than that in the image forming operation. Therefore, power saving can be attained as compared with a configuration where the speed in the image forming operation is maintained also in the non-image forming period. Further, even in the case where an instruction for starting the next image forming operation is issued in the non-image forming period, moreover, the induced voltages can be detected, and the brushless motor can be normally rotated based on the detection signal. Therefore, the next image forming operation can be started more early as compared with a case where the rotation speed of the brushless motor is allowed to be lowered to a level at which the induced voltages cannot be detected.

According to the illustrative aspect of the invention, the time period from the reception of the next image forming instruction after end of an image forming operation to the start of the next image forming operation can be suppressed from being prolonged.

BRIEF DESCRIPTION OF THE DRAWINGS

FIG. 6 is a time chart showing a timing pattern of detection of induced voltages and light reception of a light receiving sensor;

DETAILED DESCRIPTION

Exemplary embodiments of the invention will now be described with reference to the Drawings.

(1) Image Forming Apparatus

Figure 1:
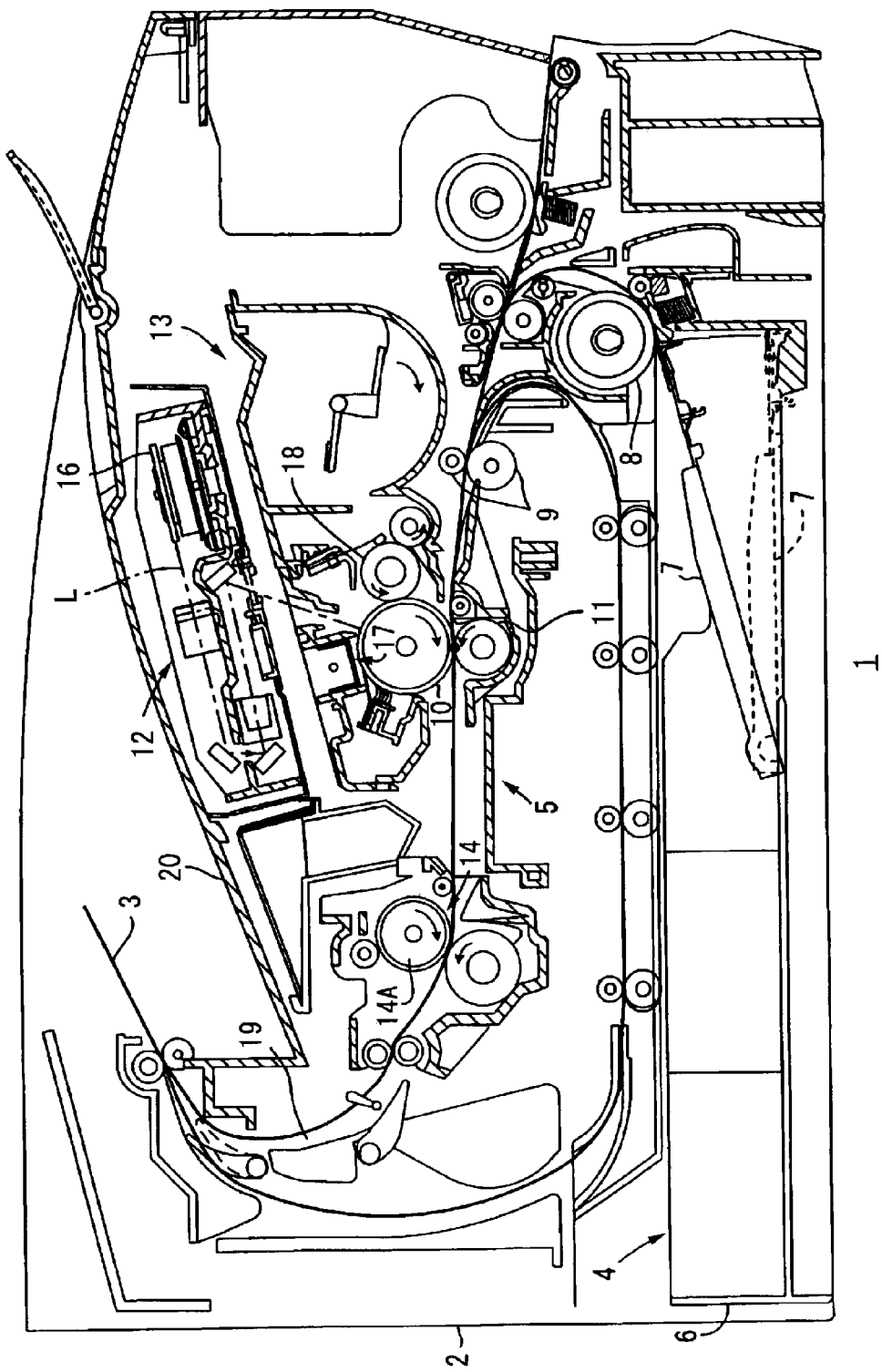
FIG. 1 is a schematic side sectional view of an image forming apparatus according to an exemplary embodiment of the invention.

FIG. 1 is a schematic side sectional view of an image forming apparatus 1.

Hereinafter, the right side of the sheet of the figure is assumed to be the front side of the image forming apparatus 1. The image forming apparatus 1 includes, in a body frame 2, a feeder unit 4 which feeds a sheet 3 (one example of image formed medium) such as a sheet, an image forming unit 5 which forms an image on the fed sheet 3, etc. Incidentally, a laser printer is one example of the image forming apparatus 1.

The image forming apparatus 1 may be a monochrome laser printer or a color laser printer using two or more colors. For example, the image forming apparatus may be a multi-function device having a facsimile function, a copy function, a reading function (scanner function) and the like, as far as the device has an image forming (printing) function.

The feeder unit 4 includes a tray 6, a pressing plate 7, a pickup roller 8 and a pair of registration rollers 9, 9. The pressing plate 7 is swingable about a rear end portion to press the uppermost one of sheets 3 on the pressing plate 7 toward the pickup roller 8. The sheets 3 are picked up one at a time by rotation of the pickup roller 8.

Then, the sheet 3 is registered by the registration rollers 9, 9 and is fed to the transferring position. The transferring position is a position where a toner image on a photosensitive member 10 is transferred to the sheet 3, and where the photosensitive member 10 contacts a transferring roller 11.

The image forming unit 5 includes a scanner unit 12, a process cartridge 13 and a fixing unit 14. The scanner unit 12 includes a light source 15 (see FIG. 3), a polygon mirror 16 (one example of a rotary polygon mirror), etc. A laser beam L (one example of a light beam) emitted from the light source 15 illuminates the surface of the photosensitive member 10 while being periodically deflected by the polygon mirror 16. The scanner unit 12 will be described later in detail.

The process cartridge 13 includes the photosensitive member 10 (which is not limited to a drum type, but may be of a belt type), a scorotron-type charger 17, and a developing roller 18. The charger 17 uniformly charges the surface of the photosensitive member 10 to a positive polarity. The charged surface of the photosensitive member 10 is exposed to the laser beam L from the scanner unit 12 to form an electrostatic latent image. Then, toner carried on the surface of the developing roller 18 is supplied to the electrostatic latent image formed on the photosensitive member 10, and the image is developed.

The sheet 3, on which the toner image is formed, is fed to the fixing unit 14 where the toner image is thermally fixed to the sheet. Then, the sheet 3 is discharged onto a sheet discharge tray 20 through a discharge path 19.

(2) Electrical Configuration of Image Forming Apparatus

Figure 2:
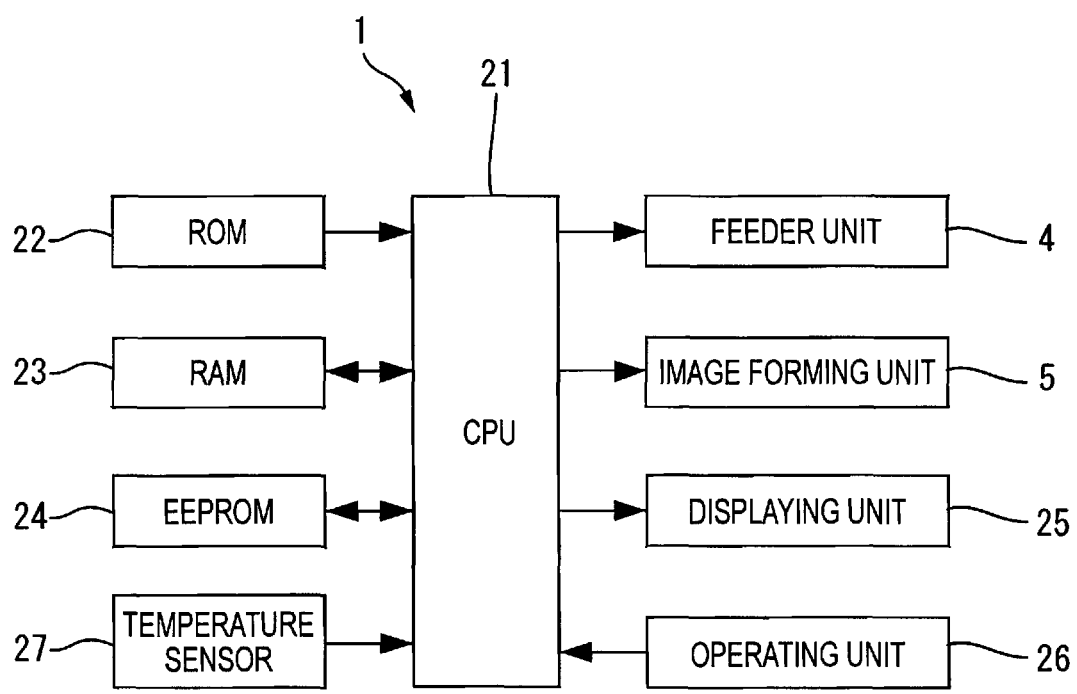
FIG. 2 is a block diagram exemplarily showing electrical configuration of the image forming apparatus.

As shown in FIG. 2, the image forming apparatus 1 includes a CPU 21, a ROM 22, a RAM 23, an EEPROM 24, the feeder unit 4, the image forming unit 5, a displaying unit 25, which is configured by various lamps, a liquid crystal panel, and the like, an operating unit 26 such as an input panel, a temperature sensor 27, etc. In addition, the image forming apparatus 1 includes a network interface (not shown) through which the image forming apparatus 1 is connected to an external apparatus, etc.

The temperature sensor 27 is disposed in a vicinity of a heating roller 14A of the fixing unit 14. The temperature sensor 27 detects the temperature (one example of a temperature of the fixing unit) of the heating roller 14A and outputs a temperature detection signal corresponding to the detection temperature. During execution of a printing process, the CPU 21 starts execution of the fixing temperature control in which the fixing unit 14 is controlled so that the temperature of the heating roller 14A is maintained at the fixable temperature value Tt [° C.], based on the temperature detection signal from the temperature sensor 27. At this time, the CPU 21 functions as a heat controlling unit. The fixable temperature value Tt [° C.] (for example, 200[° C.]) is a temperature at which the toner image that is transferred by the process cartridge 13 can be thermally fixed to the sheet 3.

(3) Scanner Unit

Figure 3:
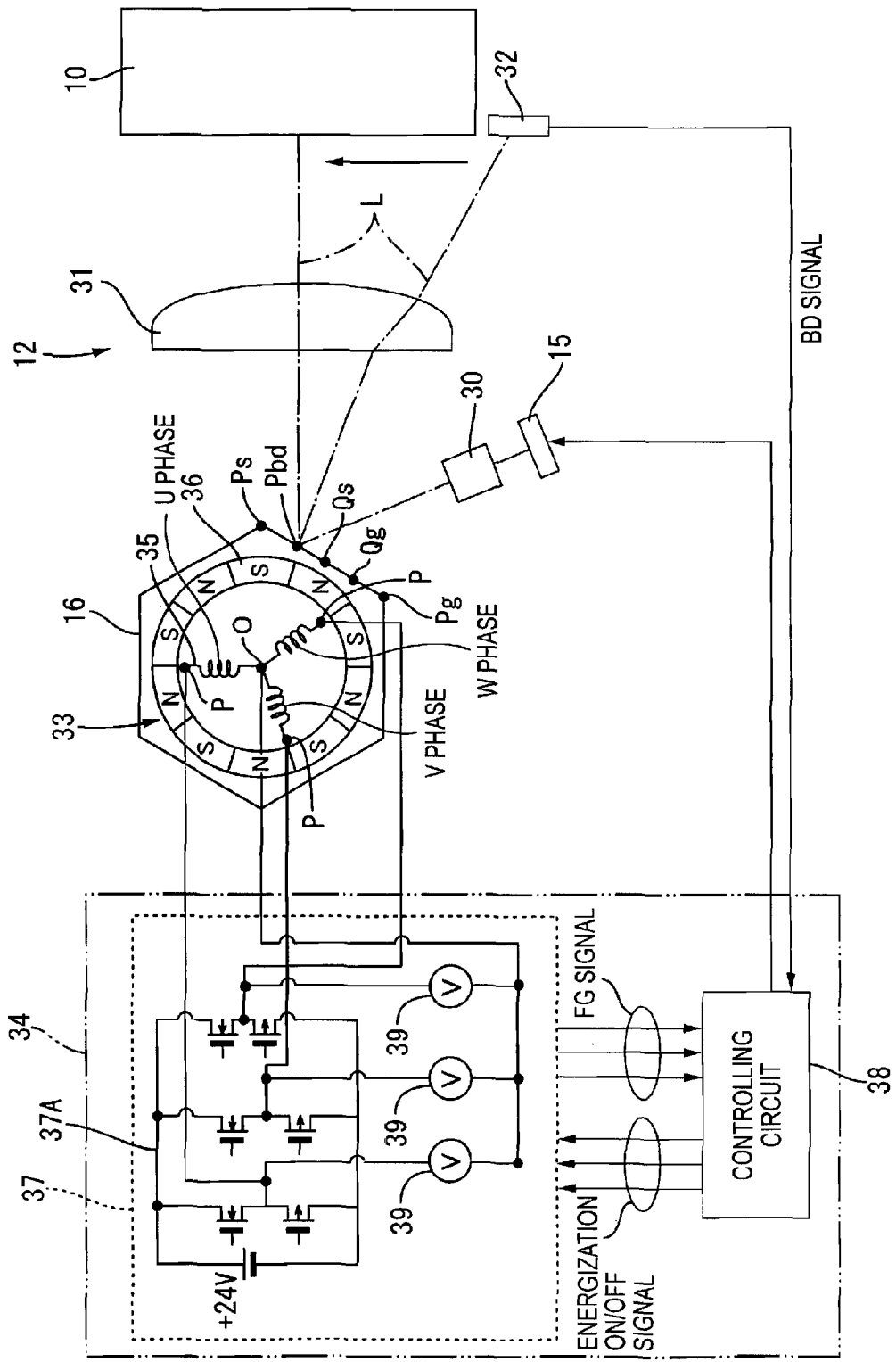
FIG. 3 is a diagram showing a configuration of a scanner unit.

As shown in FIG. 3, the scanner unit 12 includes the light source (i.e., a laser diode) 15 that emits the laser beam L, a first lens unit 30, the polygon mirror 16, a second lens unit 31, a light receiving sensor 32, a brushless motor (a polygon motor) 33, a control circuit board 34, etc.

The first lens unit 30 is configured by a collimator lens, a cylindrical lens, and the like. The first lens unit 30 allows the laser beam L emitted from the light source 15 to pass therethrough to irradiate the polygon mirror 16. The second lens unit 31 is configured by an fθ lens, a cylindrical lens, and the like. The second lens unit 31 allows the laser beam L deflected (reflected) by the polygon mirror 16 to pass therethrough to irradiate the photosensitive member 10.

The polygon mirror 16 is configured by, for example, a plurality of mirror surfaces (in the exemplary embodiment, six mirror surfaces). The polygon mirror 16 is rotated at a high speed by the brushless motor 33. When rotated at a high speed, the polygon mirror 16 periodically deflects the laser beam L emitted from the light source 15, to sequentially form scanning lines on the photosensitive member 10 through the second lens unit 31. The scanning lines are dot-like exposure lines corresponding to line data of image data. In the case where line data correspond to a blank portion of an image, scanning lines are not formed.

The brushless motor 33 is a three-phase brushless DC motor. The brushless motor 33 has a stator 35, on which U-, V- and W-phase coils are arranged, and a rotor 36, on which field permanent magnets (in the exemplary embodiment, for example, ten poles) are arranged. In the brushless motor 33, the coils are arranged in star connection. The polygon mirror 16 is rotated integrally with the rotor 36.

A driving circuit 37, a controlling circuit 38 (one example of a motor controlling unit), and the like, are mounted on the control circuit board 34. The driving circuit 37 rotates the brushless motor 33. The driving circuit 37 includes, for example, an inverter 37A (one example of an energization switching unit) to turn on or off the energizations of the coils. The controlling circuit 38 is configured by, for example, an ASIC. The controlling circuit 38 controls the light emission of the light source 15 and the rotation of the brushless motor 33 (the polygon mirror 16) based on instructions from the CPU 21.

The light receiving sensor 32 is placed at a position where the laser beam L is received before the laser beam L deflected by the polygon mirror 16 reaches the photosensitive member 10. The light receiving sensor 32 is used for determining a timing of writing each scanning line with the laser beam L, receives the laser beam L emitted from the light source 15, and outputs a BD (Beam Detect) signal to the controlling circuit 38. Alternatively, the light receiving sensor 32 may be placed at a position where the laser beam L is received after the laser beam L passes through the photosensitive member 10.

(4) Configuration for Detecting Position of Rotor

The controlling circuit 38 detects the position of the rotor 36 without using a position detecting element such as a Hall element. That is, the controlling circuit 38 detects the position of the rotor 36 on the basis of the induced voltages that are generated in the coils in accordance with rotation of the rotor 36 with respect to the stator 35.

When the rotor 36 rotates, S- and N-pole magnets alternately approach (magnetize) each of the coils, magnetic fluxes in the coil are correspondingly changed, and the induced voltage is generated in the coil. The impedance of each coil is different depending on the polarity of the approaching magnet, i.e., the S-pole or the N-pole. Therefore, the induced voltage has a waveform (for example, a sinusoidal wave) that is periodically changed to different levels respectively corresponding to timings of approaches of the S-pole and the N-pole. Therefore, by detecting the induced voltage, it is possible to detect the position of the rotor 36 (i.e., the polarity of the magnet approaching each coil).

The configuration for detecting the induced voltage will be described. As shown in FIG. 3, the driving circuit 37 includes three voltage detecting circuits 39, 39, 39 (one example of a voltage detecting unit) respectively corresponding to the coils. Each of the voltage detecting circuits 39 outputs a detection signal corresponding to the voltage difference (including the induced voltage) between the end point P of the corresponding coil (i.e., the end of the coil on the side connected to the driving circuit 37) and the neutral point O of the star connection. The driving circuit 37 converts each of the detection signals to a high/low signal (hereinafter, referred to as an FG signal), the level of which is inverted in accordance with a change of the induced voltage (i.e., the switching of the polarity of the magnet approaching the coil) through, for example, a comparator (not shown), and supplies the signal to the controlling circuit 38. Incidentally, the FG signal may also be called as a detection signal.

Figure 4:
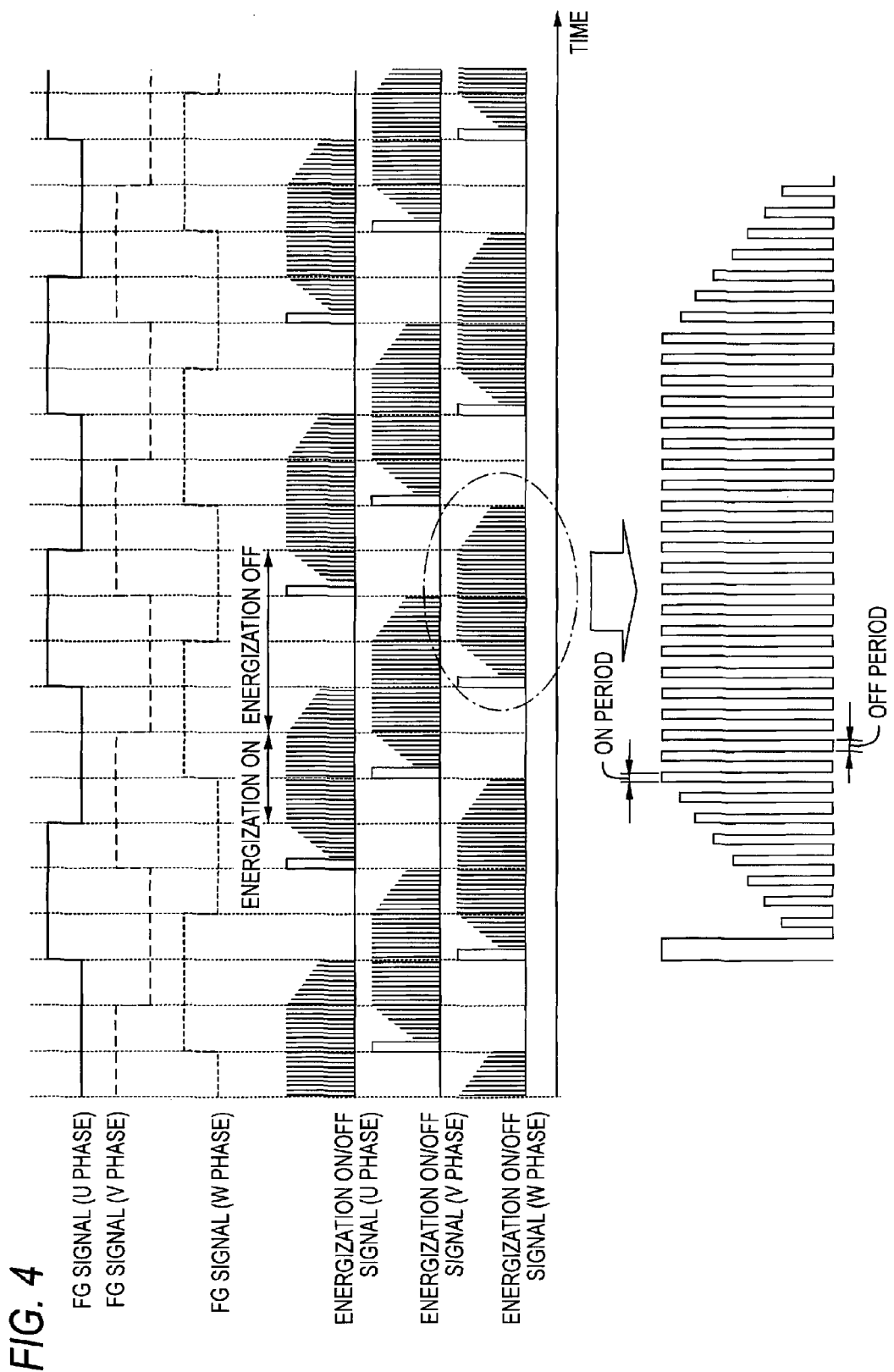
FIG. 4 is a time chart showing waveforms of FG signals and energization on/off signals.

FIG. 4 is a time chart showing waveforms of the FG signals and energization on/off signals. As shown in FIG. 4, the FG signals respectively corresponding to the phases are supplied to the controlling circuit 38 as waveforms in which the phases are shifted by about 120 deg. from one another. The controlling circuit 38 supplies the energization on/off signals respectively corresponding to the FG signals, to the driving circuit 37 to control the turning on/off of energizations of the coils. Therefore, the rotation of the brushless motor 33 can be controlled. In the energization on period, the portions where the amplitude of the PWM signal is gradually increased/decreased are energized when the coil of another phase is energized. The portion where the amplitude of the PWM signal is constant corresponds to a period where the coil of the own phase is energized. Each of the induced voltages is detected in the off period of chopping in the period where the amplitude of the PWM signal is gradually increased in the energization on period.

The controlling circuit 38 adjusts the current amount in the energization on time by, for example, the pulse width modulation, so that the rotation speed of the brushless motor 33 can be changed. As shown in FIG. 4, specifically, the controlling circuit 38 changes the PWM value (duty ratio) by performing chopping control on the inverter 37A during the energization on time on the basis of PWM signals, thereby changing the rotation speed of the brushless motor 33.

The initial pulse of each of the PWM signals is set to be larger in at least one of pulse width and amplitude than the subsequent pulse group. Therefore, in the initial stage of each energization on time, a driving current which is relatively large is flown so as to enable the brushless motor 33 to be smoothly rotated. In the subsequent pulse group, the amplitude is stepwise raised, and then stepwise lowered. In on/off switching of energization, therefore, noise generation can be suppressed.

As shown in FIG. 3, the control circuit board 34 is placed at a position separated from the place where the brushless motor 33 (the polygon mirror 16) is installed, and connected to the brushless motor 33 through only four signal lines, which are connected to the three end points P of the coil, and the neutral point O, respectively.

(5) Control of Rotation of Brushless Motor

Figure 5A:
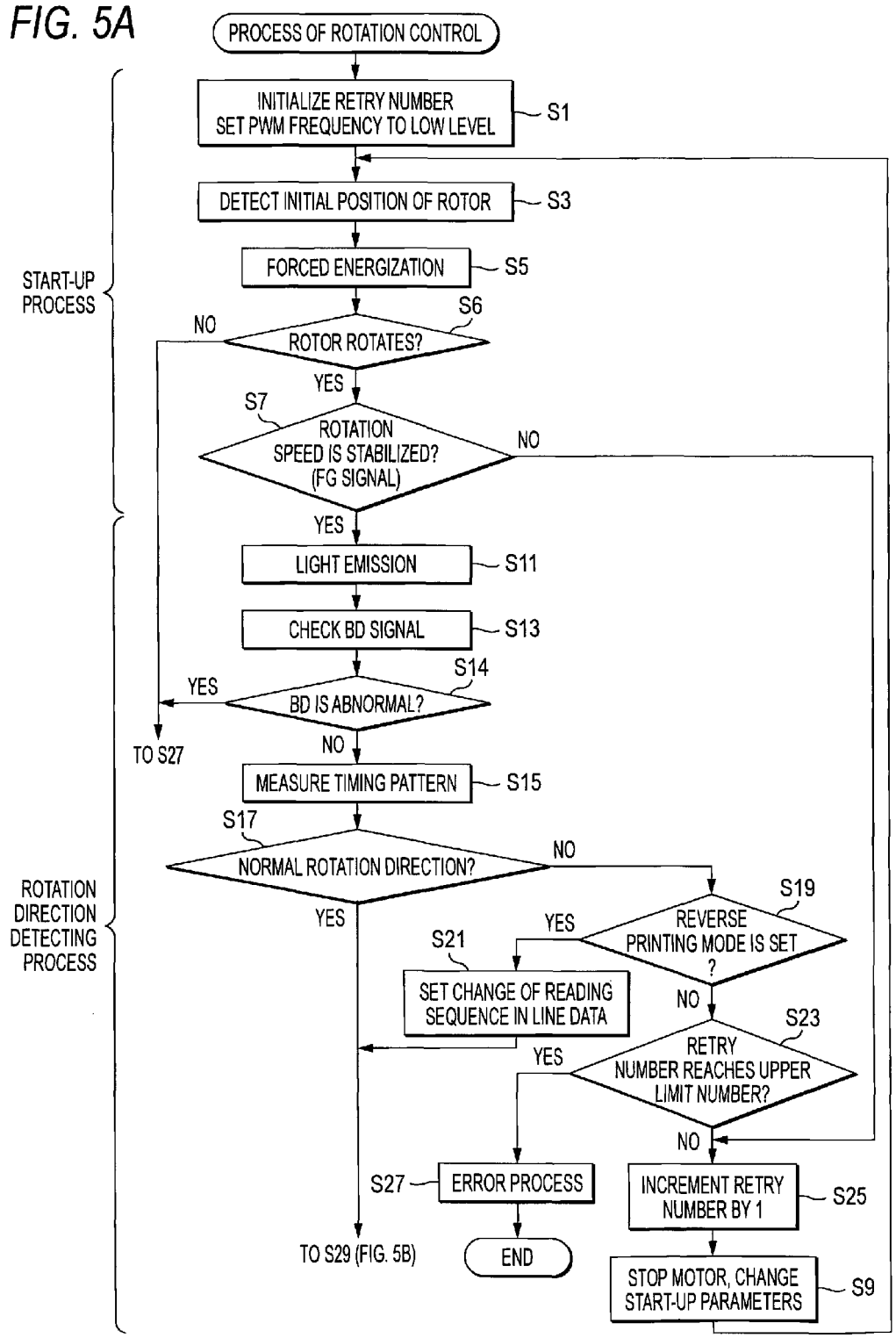
FIGS. 5A and 5B are flowcharts showing a rotation control process.
Figure 5B:
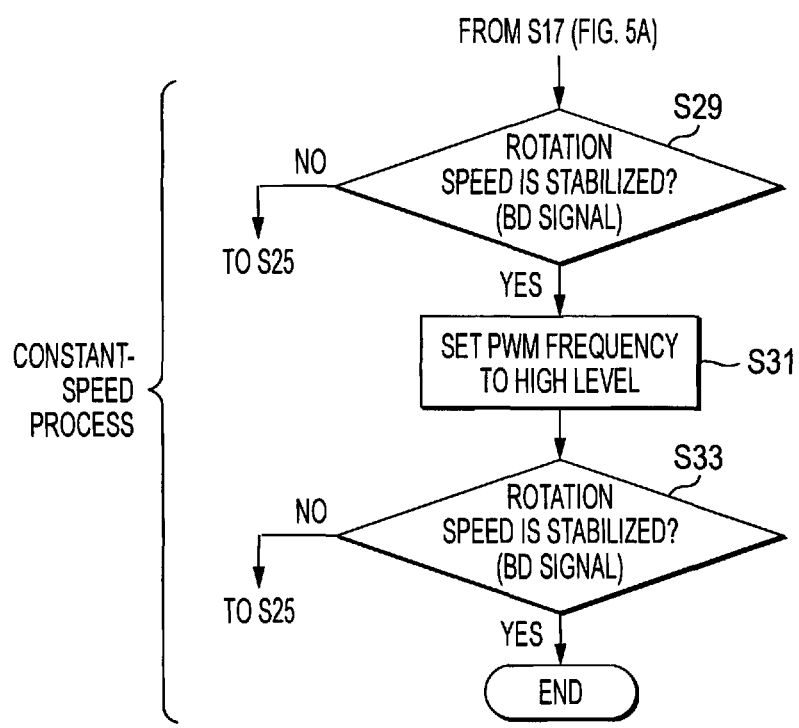

FIGS. 5A and 5B are flowcharts showing a process of controlling the rotation of the brushless motor 33. For example, the user performs an input operation for requesting the printing process through the operating unit 26, or an external apparatus (for example, a personal computer) (not shown) transmits a print request to the image forming apparatus 1. The print request may include print data. Based on the print request, then, the CPU 21 transmits rotation start instructions (an example "instructions for starting the image forming operation" in the invention) for the polygon mirror 16, to the controlling circuit 38. Upon receiving the rotation start instructions, the controlling circuit 38 executes the rotation control process shown in FIGS. 5A and 5B. In the rotation control process, a start-up process, a rotation direction detecting process, and a constant-speed process are sequentially executed.

(5-1) Start-Up Process

In the start-up process, first, the controlling circuit 38 initializes a retry number stored in, for example, the EEPROM 24 to zero, and sets the PWM frequency to a low level (for example, 125 [kHz]) (S1). The PWM frequency is the frequency of the pulses of the PWM signals, and equal to the frequency of the chopping control during the energization on time.

Next, the controlling circuit 38 detects the initial position (the stop position before the start up) of the rotor 36 (S3). Specifically, the circuit controls the driving circuit 37 so that currents flow through the coils, and the magnetic fluxes in the coils are changed in accordance with the position of the rotor 36. Accompanied with this, the FG signals are changed. Therefore, the initial position of the rotor 36 can be detected based on the FG signals.

Next, the controlling circuit 38 executes forced energization (S5). Specifically, based on the result of the detection of the initial position, the controlling circuit 38 controls the driving circuit 37 so as to forcedly energize the coils by sequentially turning on and off the energizations of the coils, thereby attempting to rotate the rotor 36. If it is confirmed that the rotor 36 begins to be rotated on the basis of the FG signals (S6: YES), the position and rotation speed of the rotor 36 can be detected based on the FG signals because the induced voltages generated in the coils are reflected in the FG signals. If the rotation of the rotor 36 cannot be confirmed (S6: NO), the control proceeds to S27.

The controlling circuit 38 reads out the FG signals during the off period in the chopping control. Then, the controlling circuit 38 supplies the PWM signals of the PWM frequency which is set to the low level in S1, to the driving circuit 37 to control the on/off of energizations of the coils, and executes the rotation speed control based on the FG signals, thereby attempting to perform full scale start-up of the brushless motor 33.

Next, the controlling circuit 38 determines whether the rotation speed of the brushless motor 33 is stabilized by the rotation speed control based on the FG signals or not (S7). Specifically, the rotation speed of the brushless motor 33 is detected on the basis of the on/off cycle of at least one (in the exemplary embodiment, one FG signal) of the three FG signals, and it is determined whether the detected rotation speed reaches a predetermined target speed range (for example, the difference with respect to 40,000 [rpm] is equal to or smaller than a predetermined value) (one example of a speed in the image forming operation).

If the detected rotation speed is outside the target speed range (S7: NO), it is determined that the rotation speed is unstable. In the case where the initial position of the rotor 36 is erroneously detected in S3 above, for example, the brushless motor 33 is not normally rotated after the forced energization in S5, the rotation speed becomes unstable, and the start-up operation is sometimes failed. In this case, the brushless motor 33 is stopped. For example, reverse currents are caused to flow to apply a braking action on the brushless motor 33. Accordingly, the brushless motor 33 can be promptly stopped, and prepared for a retry operation.

Then, a retrying process is performed. Specifically, the retry number is incremented by one (S25), and a part or all of start-up parameters (the frequencies of the energization on/off signals, the motor lead angle, and the PWM values (motor currents)) are changed (S9). The control returns to S3 to retry the start up of the brushless motor 33. For example, the frequencies of the energization on/off signals, and the motor lead angle are increased (the timing of the predictive energization is advanced), or the PWM values are enhanced to increase the starting current, thereby facilitating the start up of the brushless motor 33.

If the detected rotation speed is within the target speed range (S7: YES), it is determined that the rotation speed is stable, and the control process is transferred (switched) to the rotation direction detecting process.

(5-2) Rotation Direction Detecting Process

The controlling circuit 38 executes the rotation direction detecting process to detect whether the rotor 36 rotates in a direction corresponding to the scanning direction (main scanning direction) with respect to the photosensitive member 10 or not. At this time, the controlling circuit 38 functions as "detecting unit". Hereinafter, a rotation direction corresponding to the main scanning direction (i.e., direction of the arrow in FIG. 3) is referred to as "normal rotation direction", and a rotation direction opposite to the normal rotation direction is referred to as "reverse rotation direction".

In the rotation direction detecting process, the controlling circuit 38 controls the light source 15 so as to start the light emission (S11). Therefore, the light receiving sensor 32 periodically receives the laser beam L deflected by the polygon mirror 16, and outputs the BD signal in accordance with the light receiving timing.

Next, the controlling circuit 38 checks the BD signal (S13). Specifically, the controlling circuit determines whether the rotation speed of the polygon mirror 16 based on the cycle of the BD signal (hereinafter, the speed is sometimes referred to as the BD rotation speed) is within the target speed range or not. If it is determined that an abnormality such as that the BD signal cannot be detected, or that the BD rotation speed is unstable occurs (S14: YES), an error process (S27) such as stopping of the rotation control on the brushless motor 33, and displaying of information relating to the error is performed. By contrast, if it is determined that the process is normally performed (S14: NO), the control proceeds to S15.

Next, on the basis of the one FG signal and the BD signal that are received at this timing, the controlling circuit 38 measures the timing pattern of the detection of the induced voltage and the light reception of the light receiving sensor 32 (S15). The timing pattern is determined by the location relationship between the rotor 36 and the polygon mirror 16, and is different usually depending on the rotation direction. Therefore, based on the timing pattern, the rotation direction of the rotor 36 can be detected.

Specifically, a predetermined number (one or more) of the time differences between the change timing (the rising timing or the falling timing) of the FG signal and the change timing (the rising timing or the falling timing) of the BD signal are calculated. The calculated time differences are set as the timing pattern.

FIG. 6 is a time chart showing the timing pattern of detection of the induced voltages and light reception of the light receiving sensor 32. In the figure, α and β indicate a time differences from the rising timing of the FG signal and to the falling timing of the BD signal, respectively, wherein α (α1, α2, α3, α4 and α5) indicates a time difference in the case where the rotor 36 rotates in the normal rotation direction, and β (β1, β2, β3, β4 and β5) indicates a time difference in the case where the rotor 36 rotates in the reverse rotation direction.

As shown in FIG. 6, in the case where the rotor 36 rotates in the normal rotation direction, the controlling circuit 38 periodically calculates the time difference in the sequence of α1, α2, α3, α4 and α5. By contrast, in the case where the rotor 36 rotates in the reverse rotation direction, the controlling circuit 38 periodically calculates the time difference in the sequence of β1, β2, β3, β4 and β5.

On the other hand, for example, the EEPROM 24 previously stores reference pattern data. The reference pattern data include reference pattern data (α1, α2, α3, α4, α5) of the normal rotation direction and reference pattern data (β1, β2, β3, β4, β5) of the reverse rotation direction. Incidentally, the reference pattern data are prepared in production stage of the image forming apparatus 1 on the basis of a timing pattern that is experimentally measured in a state where the polygon mirror 16 is stably rotated within the target speed range.

The controlling circuit 38 compares the currently measured timing pattern with the reference pattern data (reference pattern), and, based on a result of the comparison, detects the rotation direction of the rotor 36 (S17). Specifically, when the measured timing pattern data coincide with the pattern data of the normal rotation direction, it is determined that the rotor rotates in the normal rotation direction, and, when the timing pattern data coincide with the pattern data of the reverse rotation direction, it is determined that the rotor rotates in the reverse rotation direction. If it is determined that the rotor rotates in the normal rotation direction (S17: YES), the control process is transferred (switches) to the constant-speed process.

If it is determined that the rotor rotates in the reverse rotation direction (S17: NO), it is determined whether a reverse printing mode is set or not (S19). In the reverse printing mode, even when the rotor 36 (the polygon mirror 16) is reversely rotated, an image in the same direction as the normal rotation is forcedly printed.

The reverse printing mode is set in such a case that the user inputs instructions through the operating unit 26, or that the temperature (ambient temperature) measured by the temperature sensor 27 disposed in the image forming apparatus 1 is equal to or lower than a predetermined temperature, because of the following reason. In the case where the ambient temperature is low to some extent, there is a possibility that the lubricant in the brushless motor 33 hardens and the rotation cannot be smoothly controlled. When a retrying process is performed under this situation, a long time period is required. This is not preferable.

If the reverse printing mode is set (S19: YES), the reading sequence in each line data of the image data is reversely set (S21), and the control process is transferred (switches) to the constant-speed process. Therefore, when the printing process is executed, the controlling circuit 38 controls the light emission of the light source 15 based on the line data in a pattern that is the reversal of that in the case where the polygon mirror 16 is rotated in the normal rotation direction. Even in the reverse rotation, an image, which is substantially identical with that in the normal rotation, can be forcedly printed. At this time, the controlling circuit 38 functions as "light emission controlling unit".

As shown in FIG. 3, in the case where the polygon mirror 16 is rotated in the normal direction (counterclockwise direction) and a latent image for one exposure line is formed on the photosensitive member 10, the starting point where one surface of the polygon mirror 16 is started to be illuminated with the laser beam L from the light source 15 is indicated by Ps, the point where the reflected light is received by the light receiving sensor 32 is indicated by Pbd, and the end point is indicated by Pg. In the one surface of the polygon mirror 16, the point illuminated with the laser beam L at the timing of starting the reading of line data is indicated by Qs, and the point illuminated with the laser beam L at the timing of ending the reading of line data is indicated by Qg. In the case where the polygon mirror 16 is rotated in the normal direction, the reading of line data is started after the time period required for the laser beam L to advance the length of the line segment PbdQs has elapsed from the light receiving timing of the light receiving sensor 32. By contrast, in the case where the polygon mirror 16 is rotated in the reverse direction, the reading of line data is started after the time period required for the laser beam L to advance the length of the line segment (PbdPs+PgQg) has elapsed from the light receiving timing of the light receiving sensor 32.

The controlling circuit 38 may be configured so that, in a process of expanding image data, a dot pattern, in which line data are expanded in the sequence reverse to that in the case of the normal rotation, is formed, and the light emission of the light source 15 is controlled in accordance with the dot pattern. Alternatively, the controlling circuit may be configured so that, when a dot pattern that has undergone a normal expanding process is to be read out, the reading is performed in the sequence reverse to that in the case of the normal rotation, and the light emission of the light source 15 is controlled in accordance with the dot pattern of the reverse sequence.

If it is determined in S19 the reverse printing mode is not set (S19: NO), it is determined whether the current retry number reaches the upper limit number or not (S23). If the current retry number does not reach the upper limit number (S23: NO), the retrying process is performed. Specifically, the retry number is incremented by one (S25), the control process is returned to S9, and the processes subsequent to S9 are repeated.

If the current retry number reaches the upper limit number (S23: YES), the error process is executed (S27), and the rotation control process is ended.

(5-3) Constant-Speed Process

In the constant-speed process, the controlling circuit 38 switches the rotation speed control from one based on the FG signals to one based on the BD signal, and determines whether the rotation speed of the polygon mirror 16 is stable or not (S29). Specifically, the rotation speed of the polygon mirror 16 is detected on the basis of the on/off cycle of the BD signal, and it is determined whether the detected rotation speed is within the predetermined target speed range or not. If the detected rotation speed is outside the target-speed range (S29: NO), it is determined that the rotation speed is unstable, and the control process is returned to S25.

If the detected rotation speed of the polygon mirror 16 is within the target-speed range (S29: YES), it is determined that the rotation speed is stable, and the PWM frequency is switched to a high level (for example, 250 [kHz]) (S31). Based on the BD signal, then, it is again determined whether the rotation speed is within the predetermined target speed range or not (S33). If the detected rotation speed is outside the target-speed range (S33: NO), it is determined that the rotation speed is unstable, and the control process is returned to S9. By contrast, if the detected rotation speed is within the target-speed range (S33: YES), it is determined that the rotation speed is stable, and the rotation control process is ended, thereby completing the preparation for the printing process. Thereafter, the CPU 21 causes the feeder unit 4 and the image forming unit 5 to start the printing process.

(5-4) Low-Speed Process

Figure 7:
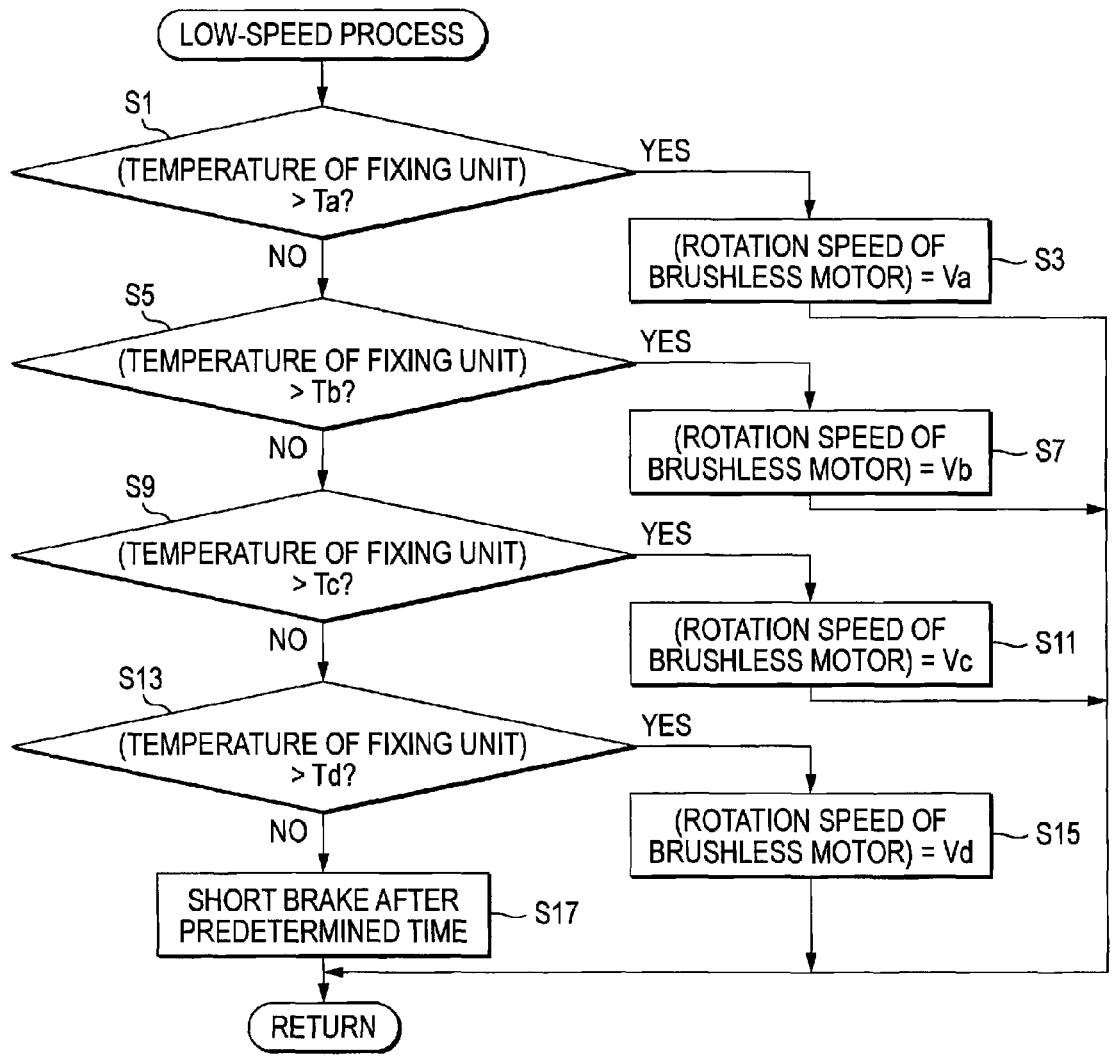
FIG. 7 is a flowchart showing a low-speed process of a brushless motor.
Figure 8:
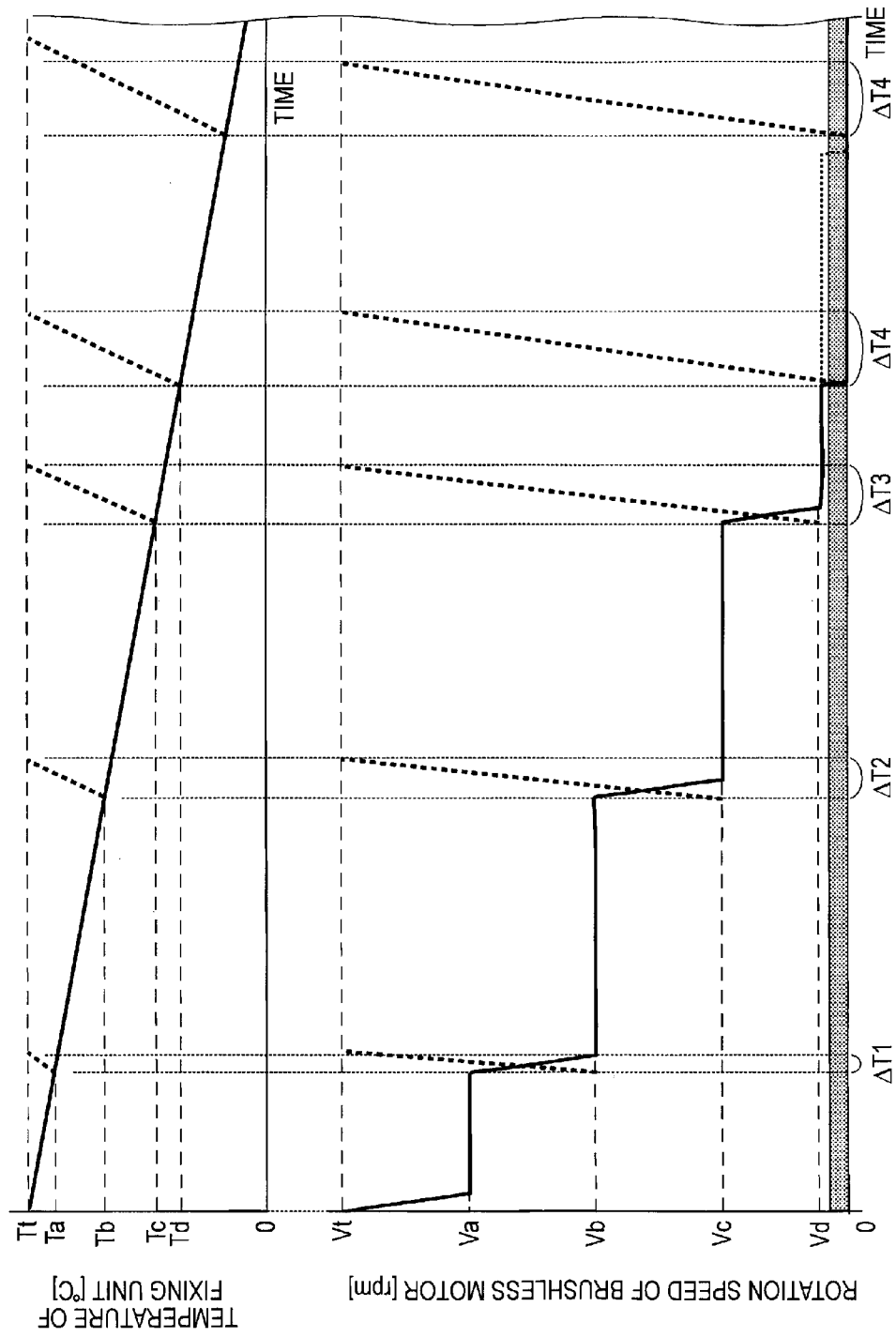
FIG. 8 is a time chart showing changes of the temperature of a fixing unit and the rotation speed of the brushless motor in a non-printing period.

FIG. 7 is a flowchart showing a low-speed process of the brushless motor 33, and FIG. 8 is a time chart showing changes of the temperature of the fixing unit 14 and the rotation speed of the brushless motor 33 in a non-printing period (one example of a non-image forming period) after the printing process is ended. In FIG. 8, Vt indicates the rotation speed (for example, 40,000 [rpm] above) in the target speed range, and Tt indicates the fixable temperature.

In the non-printing period, the CPU 21 stops the fixing temperature control on the fixing unit 14, and informs of the end of the printing process to the controlling circuit 38. The CPU 21 determines the transfer to the non-printing period, by using, as a trigger, reception of a signal indicating that the rear end of the sheet 3 passes through the detection region for the rear end from, for example, a sheet discharge sensor (not shown) disposed between the fixing unit 14 and the sheet discharge tray 20.

Therefore, the controlling circuit 38 stops the light emission control on the light source 15, and performs the low-speed process. By performing the low-speed process, the controlling circuit 38 controls the inverter 37A so that the rotation speed of the brushless motor 33 is maintained at a speed which is lower than the target speed value Vt, and at which the induced voltages can be detected by the voltage detecting circuits 39. In other words, the controlling circuit controls the inverter 37A so that the rotation speed of the brushless motor 33 is not lowered to a speed at which the induced voltages cannot be detected by the voltage detecting circuits 39. In the exemplary embodiment, the lower limit value of the speed at which the induced voltages can be detected is, for example, 2,000 [rpm] (a fourth rotation speed value Vd which will be described later). In the case where the controlling circuit 38 receives the next rotation start instruction during execution of the low-speed process, the controlling circuit aborts the low-speed process and transfers to S6 of the start-up process.

Specifically, immediately after the printing process, first, the controlling circuit 38 controls, based on the FG signals, the inverter 37A so that the rotation speed of the brushless motor 33 is changed to a first rotation speed value Va (for example, 30,000 [rpm]) which is lower than the target speed value Vt [rpm]. When the fixing temperature control is stopped, the temperature of the fixing unit 14 is lowered with time (see the solid line graph of the time chart in the upper side of FIG. 8). The controlling circuit 38 receives a temperature detection signal directly from the temperature sensor 27, or indirectly through the CPU 21, and starts to monitor the temperature of the fixing unit 14.

In the case where the temperature of the fixing unit 14 is higher than a first temperature value Ta [° C.] (S1: YES), the controlling circuit 38 controls the inverter 37A so that the rotation speed of the brushless motor 33 is maintained at the first rotation speed value Va (for example, 30,000 [rpm]) (S3). When the temperature of the fixing unit 14 is then equal to or lower than the first temperature value Ta [° C.] (S1: NO and S5: YES), the rotation speed of the brushless motor 33 is changed to a second rotation speed value Vb (for example, 20,000 [rpm]) which is lower than the first rotation speed value Va [rpm] (S7). When the temperature of the fixing unit 14 is then equal to or lower than a second temperature value Tb [° C.] (S5: NO and S9: YES), the rotation speed of the brushless motor 33 is changed to a third rotation speed value Vc (for example, 10,000 [rpm]) which is lower than the second rotation speed value Vb [rpm] (S11).

When the temperature of the fixing unit 14 is equal to or lower than a third temperature value Tc [° C.] (S9: NO and S13: YES), the controlling circuit 38 changes the rotation speed of the brushless motor 33 to the fourth rotation speed value Vd (the lower limit value of the speed at which the induced voltages can be detected) which is lower than the third rotation speed value Vc [rpm] (S15). As shown in FIG. 8, the fourth rotation speed value Vd is slightly higher than a speed range (the hatched portion in the figure) where the induced voltages cannot be detected. For example, the value can be obtained from experiments.

When the temperature of the fixing unit 14 is then equal to or lower than a fourth temperature value Td [° C.] (one example of a threshold temperature) (S13: NO), the inverter 37A is controlled so that reverse currents for rotating the motor in the direction opposite to the current direction are caused to flow to apply a braking action on the brushless motor 33 (one example of a forcible stop) (S17), and the low-speed process is ended.

As described above, when entering the non-image forming period, the controlling circuit 38 stepwisely lowers the rotation speed of the brushless motor 33 in accordance with the lowering of the temperature of the fixing unit 14 (see the solid line graph of the time chart in the lower side of FIG. 8). In respective steps, the relationships between the temperature of the fixing unit 14 and the rotation speed of the brushless motor 33 are as follows.

(i) First Step: Immediately after Printing Process, Rotation Speed of the Brushless Motor 33=First Rotation Speed Value Va In the first step, the temperature of the fixing unit 14 is not substantially lowered. At any timing in the first step, therefore, approximate equality is requested to be attained between the time which elapses before the temperature of the fixing unit 14 is returned from the present temperature to the fixable temperature value Tt [° C.] by restarting the fixing temperature control, and that which elapses before the rotation speed of the brushless motor 33 is returned by the control of the inverter 37A from the first rotation speed value Va to the target speed value Vt [rpm] (hereinafter, this relationship is referred to as "relationship 1").

(ii) Second Step: Rotation Speed of the Brushless Motor 33=Second Rotation Speed Value Vb In the second step, the time which elapses before the temperature of the fixing unit 14 is returned from the first temperature value Ta [° C.] to the fixable temperature value Tt [° C.] by restarting the fixing temperature control is approximately equal to that which elapses before the rotation speed of the brushless motor 33 is returned by the control of the inverter 37A from the second rotation speed value Vb [rpm] to the target speed value Vt [rpm] (see the broken line graph and ΔT1 in FIG. 8, hereinafter, this relationship is referred to as "relationship 2"). Even when the controlling circuit 38 receives the next rotation start instructions due to the next print request in the second step, therefore, the controlling circuit can bring the rotation speed of the brushless motor 33 to the target speed value Vt [rpm] until, at the latest, the temperature of the fixing unit 14 reaches the fixable temperature value Tt [° C.]. As described above, in the printing process, the thermal fixation is performed by the fixing unit 14 after the exposure by the scanner unit 12. According thereto, it is possible to prevent the electric power from being wastefully consumed by raising the temperature of the fixing unit 14 to the fixable temperature value Tt [° C.] at an excessively earlier timing.

(iii) Third Step: Rotation Speed of the Brushless Motor 33=Third Rotation Speed Value Vc In the third step, the time which elapses before the temperature of the fixing unit 14 is returned from the second temperature value Tb [° C.] to the fixable temperature value Tt [° C.] by restarting the fixing temperature control is approximately equal to that which elapses before the rotation speed of the brushless motor 33 is returned by the control of the inverter 37A from the third rotation speed value Vc [rpm] to the target speed value Vt [rpm] (see the broken line graph and ΔT2 in FIG. 8, hereinafter, this relationship is referred to as "relationship 3"). Therefore, even when the controlling circuit 38 receives the next rotation start instructions due to the next print request in the third step, the controlling circuit can cause the rotation speed of the brushless motor 33 to reach the target speed value Vt [rpm] until, at the latest, the temperature of the fixing unit 14 reaches the fixable temperature value Tt [° C.].

(iv) Fourth Step: Rotation Speed of the Brushless Motor 33=Fourth Rotation Speed Value Vd In the fourth step, the time which elapses before the temperature of the fixing unit 14 is returned from the third temperature value Tc [° C.] to the fixable temperature value Tt [° C.] by restarting the fixing temperature control is approximately equal to that which elapses before the rotation speed of the brushless motor 33 is returned by the control of the inverter 37A from the fourth rotation speed value Vd [rpm] to the target speed value Vt [rpm] (see the broken line graph and ΔT3 in FIG. 8, hereinafter, this relationship is referred to as "relationship 4"). Therefore, even when the controlling circuit 38 receives the next rotation start instructions due to the next print request in the fourth step, the controlling circuit can cause the rotation speed of the brushless motor 33 to reach the target speed value Vt [rpm] until, at the latest, the temperature of the fixing unit 14 reaches the fixable temperature value Tt [° C.].

(v) Fifth Step: Brushless Motor 33 is Stopped

In the fifth step, the time which elapses before the temperature of the fixing unit 14 is returned from the fourth temperature value Td [° C.] to the fixable temperature value Tt [° C.] by restarting the fixing temperature control is approximately equal to that which elapses before the rotation speed of the brushless motor 33 is returned by the control of the inverter 37A from zero [rpm] (stop state) to the target speed value Vt [rpm] (see the broken line graph and ΔT4 in FIG. 8, hereinafter, this relationship is referred to as "relationship 5"). Therefore, Even when the controlling circuit 38 receives the next rotation start instructions due to the next print request in a state where the brushless motor 33 is stopped after stop of the low-speed process, the rotation speed of the brushless motor 33 can reach the target speed value Vt [rpm] before the temperature of the fixing unit 14 reaches the fixable temperature value Tt [° C.].

In the present exemplary embodiment, the rotation speed values Va to Vd [rpm] of the brushless motor may be predetermined fixed values. Alternatively, the values may be variable values as follows. In the last or previous printing process (for example, the first printing process after the power-on of the image forming apparatus 1), the variation amount (inclination) per unit time of the rotation speed of the brushless motor 33 by the control of the inverter 37A is measured, and the variation amount (inclination) per unit time of the temperature of the fixing unit 14 by the fixing temperature control is measured. The measured amounts are stored in, for example, the EEPROM 24. In each of the steps of the low-speed process, when the temperature of the fixing unit 14 reaches the temperature values Ta to Td [° C.], the controlling circuit 38 refers the inclination information of the rotation speed of the brushless motor 33 and the temperature of the fixing unit 14, and calculates the rotation speed values Va to Vd [rpm] of the brushless motor 33 which satisfy relationships 1 to 5 above. As a result, even when the ambient environment (the temperature and the like) of the image forming apparatus 1 is varied, the rotation speed values Va to Vd [rpm] can be adjusted to adequate values.

(6) Effects of the Exemplary Embodiment

According to the exemplary embodiment, in the non-printing period, the low-speed process is performed in which the rotation speed of the brushless motor 33 is maintained at the rotation speed values Va to Vd [rpm] which are lower than the target speed value Vt [rpm], and at which the induced voltages can be detected by the voltage detecting circuits 39. Thus, even in the case where the next rotation start instruction is issued in the non-printing period, the induced voltages can be detected, and the brushless motor 33 can be normally rotated based on the FG signals. Therefore, as compared with a case in which the rotation speed of the brushless motor 33 is allowed to be lowered to a level at which the induced voltages cannot be detected, the next image forming operation can be started more early.

During the non-printing period, the low-speed process may be continued. When this state is maintained for a long time, however, there may possibly arise an undesirable case where, for example, the power consumption for the low-speed process is increased. Thus, in the exemplary embodiment, in the non-printing period, the low-speed process is stopped when the predetermined time has elapsed after the temperature of the fixing unit 14 is lowered to the fourth temperature value Td [° C.], so that the power consumption is suppressed. Incidentally, the time from end of one printing process to the timing when the temperature of the fixing unit 14 is lowered below the fourth temperature value Td [° C.] is one example of a reference time.

In the case where the temperature of the fixing unit 14 is lowered to some degree in the non-image forming period, when the next print request is issued, time is required for the temperature of the fixing unit 14 to reach the fixable temperature value Tt [° C.]. Therefore, in this case, it is possible to cope with the case where preference is given to a situation where the fixing temperature control is stopped and power saving is performed, over the rapidness of the rotation control of the brushless motor 33.

Furthermore, the low-speed process is stopped when a predetermined time has elapsed after the temperature of the fixing unit 14 is lowered to the fourth temperature value Td [° C.]. Therefore, the occurrence where the start of the brushless motor 33 is delayed with respect to the temperature rise of the fixing unit 14 because of a time lag (follow-up delay) of instruction transmission to the brushless motor 33 can be reduced as compared with the configuration where the low-speed process is stopped at the timing when the temperature of the fixing unit 14 is lowered to the fourth temperature value Td [° C.].

When the brushless motor 33 is to be stopped, the brushless motor 33 is not stopped by inertia, but a braking operation applied on the motor. Therefore, even in the case where the rotation start instruction due to the next print request is received immediately after the low-speed process is stopped, the time period when the rotation is at a speed at which the induced voltages cannot be detected is short as compared with the case where the brushless motor 33 is rotated by inertia. Therefore, it is possible to increase the possibility of detecting the initial position of the rotor 36 accurately. Consequently, the rotation control of the brushless motor 33 can be performed stably and rapidly.

In the exemplary embodiment, when, after the end of the printing process due to one print request, the next print request is not issued within a predetermined waiting time, the CPU 21 transfers the mode to a power saving mode in which the power consumption is more reduced than that in the printing operation. At this time, the CPU 21 functions as a transferring unit. During the period of execution of the power saving mode, the controlling circuit 38 does not perform the low-speed process. When the low-speed process is performed in the power saving mode, the process may possibly impede power saving. Thus, when the mode is transferred to the power saving mode, it is preferred that the low-speed process is not performed.

<Modification to Exemplary Embodiments>

The invention is not limited to the above-described exemplary embodiments. For example, the following various embodiments are within the scope of the invention. Among the components of the exemplary embodiments, specifically, those other than the most significant components of the invention are additional components and hence may be adequately omitted.

(1) In the above-described exemplary embodiment, the brushless motor is a three-phase outer-rotor type motor having star-connected coils. The invention is not limited thereto. For example, the phase number of the motor may be two, or four or more. An inner-rotor type motor may be employed, or a delta-connected motor may be used. In the case of the delta connection, on the base of the inter-terminal voltages of the coils, for example, a detection signal corresponding to the induced voltage can be obtained.

(2) In the above-described exemplary embodiment, the polygon mirror 16 having six mirror surfaces, and the brushless motor 33 having ten poles are used. However, the invention is not limited thereto. A brushless motor having mirror surfaces, the number of which is other than six, or a brushless motor having a pole number that is other than ten may be employed. The minimum required number of the time difference data α, β in the rotation direction detecting process can be obtained from the surface number (N) of the polygon mirror, and the pole number (M) of the brushless motor. That is, the minimum ratio (A:B) of the surface number (N) to a half (M/2) of the pole number (M) is calculated, the smaller value (A or B) in the minimum ratio is the minimum required number. Therefore, in the case where the surface number (N) is equal to a half (M/2) of the pole number, the rotation direction can be detected from one set of time difference data.

(3) In the above-described exemplary embodiment, the rotation speed of the brushless motor 33 is controlled by using the FG signals. However, the invention is not limited thereto. For example, a configuration may be employed where the number of rotations of the brushless motor 33 is monitored on the basis of the FG signals, and, under the conditions that the number of rotations reaches a reference number, various operations in the printing process such as that the light emission of the light source 15 is started, and that the sheet 3 is fed to the image forming unit 5 may be started. A configuration where timings of energizing the coils are controlled may be employed.

(4) In the above-described exemplary embodiment, in the stabilized period, the control process is transferred (switched) to the rotation speed control based on the BD signal. Alternatively, the rotation speed control based on the FG signals may be continued. Incidentally, in the stabilized period, influences due to noises are relatively reduced, and hence it is preferable to raise the frequency so that the follow-up property of the rotation control in the brushless motor 33 is enhanced.

(5) In the above-described exemplary embodiment, in the rotation control process, the PWM frequency is switched to a high level (S31) after it is confirmed that the rotation speed is stabilized based on the BD signal (S29 in FIG. 5B: YES). However, the invention is not limited thereto. After it is confirmed that the rotation speed is stabilized based on the FG signals (S7: YES), the PWM frequency may be switched to a high level. Incidentally, in terms of reliability, it may be preferable to switch the PWM frequency to a high level in accordance with the above-described exemplary embodiment.

(6) In the above-described exemplary embodiments, reverse currents are caused to flow to apply a braking action on the brushless motor 33. However, the method of "forcible stop" is not limited thereto. For example, a braking action may be applied on the brushless motor 33 by a mechanical (physical) contact with the rotor.

(7) In the above-described exemplary embodiments, the rotation speed of the brushless motor 33 is stepwisely lowered. However, the invention is not limited thereto. For example, the rotation speed may be continuously lowered toward the fourth rotation speed value Vd [rpm], or may be lowered in one stroke to the fourth rotation speed value Vd [rpm] immediately after the end of the printing process.

(8) In the above-described exemplary embodiments, the continuation time of the low-speed process can be changed in accordance with the temperature reduction of the fixing unit 14. However, the "reference time" is not limited thereto. For example, the time may be a fixed time. Alternatively, the low-speed process may be stopped when the temperature of the fixing unit 14 is lowered below the fourth temperature value Td [° C.]. In the above-described exemplary embodiments, it is possible to end the low-speed process at an appropriate timing with respect to the temperature reduction of the fixing unit 14.

According to another illustrative aspect of the invention, in the image forming apparatus, wherein the motor controlling unit stops the low-speed process when a reference time has elapsed after the end of the one image forming operation even in the non-image forming period.

According thereto, in the non-image forming period, the low-speed process is performed before the reference time has elapsed after the end of one image forming operation, and a state in which, the operation can be early started upon receiving an instruction for starting the next image forming operation is received, is maintained. However, when this state is maintained for a long time, there may possibly arise an undesirable case where, for example, the power consumption for the low-speed process is increased.

Therefore, in the invention, the low-speed process is stopped when the reference time has elapsed after the end of the one image forming operation. According thereto, it is possible to suppress the power consumption.

According to still another illustrative aspect of the invention, in the image forming apparatus, wherein the motor controlling unit forcibly stops the brushless motor to stop the low-speed process.

According thereto, when the low-speed process is stopped, the brushless motor is not stopped by inertia, but forcibly stopped by, for example, flowing reverse currents. Therefore, even in the case where an instruction for starting the next image forming operation is received immediately after the low-speed process is stopped, the initial position of the rotor can be accurately known as compared with the case where the brushless motor is rotated by inertia. Therefore, the rotation control of the brushless motor can be performed stably and rapidly.

According to still another illustrative aspect of the invention, the image forming apparatus further comprises: a fixing unit that thermally fixes the toner image transferred to a recording medium from the photosensitive member; and a heat controlling unit that is configured to: during the image forming operation, perform a fixing temperature control where a temperature of the fixing unit is maintained at a fixable temperature, and in the non-image forming period, stop the fixing temperature control, wherein the reference time is a time when the temperature of the fixing unit is lowered to a threshold temperature, which is lower than the fixable temperature, in the non-image forming period (or a time when a predetermined time has elapsed after the temperature of the fixing unit is lowered to the threshold temperature).

In the case where the temperature of the fixing unit is lowered to some degree in the non-image forming period, when an instruction for starting the next image forming operation is issued, time is required for the temperature of the fixing unit to reach the fixable temperature. Therefore, in this case, it is possible to cope with the case where preference is given to a situation where the fixing temperature control is stopped and power saving is performed, over the rapidness of the rotation control of the brushless motor.

According to still another illustrative aspect of the invention, in the image forming apparatus, wherein a time elapsing before the temperature of the fixing unit is raised from the threshold temperature to the fixable temperature by the fixing temperature control is equal to or longer than a time elapsing before the brushless motor is brought from a stop state to a rotation state in which the brushless motor rotates at the rotation speed in the image forming operation by the motor control.

According thereto, even in the case where, after the temperature of the fixing unit is lowered to the threshold temperature or less and the low-speed process is stopped, an instruction for starting the next image forming operation is received in a state where the brushless motor is stopped, it is possible to bring the brushless motor to a rotation state in which the brushless motor rotates at the rotation speed in the image forming operation, before the temperature of the fixing unit reaches the fixable temperature.

According to still another illustrative aspect of the invention, in the image forming apparatus, wherein in the non-image forming period, the motor controlling unit controls rotation driving of the brushless motor at a rotation speed such that: the rotation speed is lowered in accordance with temperature reduction of the fixing unit; and when an instruction for starting the image forming operation is received, the rotation speed can be returned to the rotation speed in the image forming operation by the motor control before, at a latest, the temperature of the fixing unit reaches the fixable temperature by the fixing temperature control.

According thereto, even in the case where an instruction for starting the next image forming operation is received during the non-image forming period, it is possible to bring the brushless motor to a rotation state in which the brushless motor rotates at the rotation speed in the image forming operation, before the temperature of the fixing unit reaches the fixable temperature.

According to still another illustrative aspect of the invention, the image forming apparatus further comprises: a transferring unit which, in a case where instructions for starting a next image forming operation is not issued within a predetermined time after the image forming operation is ended, transfers the image forming apparatus to a power saving mode where a power consumption is further reduced than the image forming operation, wherein during execution of the power saving mode, the motor controlling unit does not execute the low-speed process.

When the low-speed process is performed in the power saving mode, the process may possibly impede power saving. Therefore, when the mode is transferred to the power saving mode, it is preferred that the low-speed process is not performed.

What is claimed is:

1. An image forming apparatus comprising:
    a light source configured to emit a light beam;
    a photosensitive member configured to carry a toner image;
    a brushless motor comprising:
        a stator in which a plurality of coils are placed; and
        a rotor in which a plurality of magnets are placed;
    a rotary polygon mirror, which is rotated by the brushless motor, and which is configured to periodically deflect the light beam emitted from the light source to sequentially form scanning lines on the photosensitive member;
    an energization switching unit configured to turn on and off energizations of the coils;
    a voltage detecting unit configured to output a detection signal based on induced voltages that are generated in the coils by rotation of the rotor;
    a motor controlling unit configured to control the turning on/off of the energizations by the energization switching unit based on the detection signal;
    a fixing unit configured to thermally fix the toner image transferred to a recording medium from the photosensitive member; and
    a heat controlling unit that is configured to:
        perform a fixing temperature control, during the image forming operation, in which a temperature of the fixing unit is maintained at a fixable temperature; and
        stop the fixing temperature control in a non-image forming period,
    wherein, in a non-image forming period after one image forming operation is ended, the motor controlling unit performs a low-speed process, and
    wherein, in the low-speed process, the motor controlling unit is configured to maintain a rotation speed of the brushless motor at a speed, which is less than a speed in the image forming operation, and at which the induced voltages are detectable by the voltage detecting unit,
    wherein, in the low-speed process, the motor controlling unit is further configured to:
        maintain the rotation speed of the brushless motor at a first rotation speed, which is less than the speed in the image forming operation, until the temperature of the fixing unit becomes less than a first temperature;
        decrease the rotation speed of the brushless motor, when the temperature of the fixing unit becomes less than the first temperature, from the first rotation speed to a second rotation speed at which the induced voltages are detectable by the voltage detecting unit; and
        maintain the rotation speed of the brushless motor at the second rotation speed until the temperature of the fixing unit becomes less than a second temperature.

2. The image forming apparatus according to claim 1, wherein the motor controlling unit stops the low-speed process when a reference time has elapsed after the end of the one image forming operation even in the non-image forming period.

3. The image forming apparatus according to claim 2, wherein the motor controlling unit forcibly stops the brushless motor to stop the low-speed process.

4. The image forming apparatus according to claim 2, wherein the reference time is a time when the temperature of the fixing unit is decreased to a threshold temperature, which is less than the fixable temperature, in the non-image forming period.

5. The image forming apparatus according to claim 4, wherein a time elapsing before the temperature of the fixing unit is raised from the threshold temperature to the fixable temperature by the fixing temperature control is equal to or longer than a time elapsing before the brushless motor is brought from a stop state to a rotation state in which the brushless motor rotates at the rotation speed in the image forming operation by the motor control.

6. The image forming apparatus according to claim 1, wherein, in the non-image forming period, the motor controlling unit is configured to control rotation driving of the brushless motor at a rotation speed such that:
    the rotation speed is decreased in accordance with temperature reduction of the fixing unit in a stepwise manner; and
    when an instruction for starting the image forming operation is received, the rotation speed can be returned to the rotation speed in the image forming operation by the motor control before, at a latest, the temperature of the fixing unit reaches the fixable temperature by the fixing temperature control.

7. The image forming apparatus according to claim 1, further comprising:
    a transferring unit which, in a case where instructions for starting a next image forming operation is not issued within a predetermined time after the image forming operation is ended, transfers the image forming apparatus to a power saving mode where a power consumption is further reduced than the image forming operation,
    wherein during execution of the power saving mode, the motor controlling unit does not execute the low-speed process.

8. The image forming apparatus according to claim 1, wherein the plurality of coils are connected via a star connection, and wherein the voltage unit is connected to a neutral point of the star connection and an end point of each coil of the plurality of coils different from the neutral point.

* * * * *